(12) United States Patent
Wobben

(10) Patent No.: US 7,462,947 B2
(45) Date of Patent: Dec. 9, 2008

(54) METHOD FOR OPERATING A WIND TURBINE

(76) Inventor: Aloys Wobben, Argestrasse 19, Aurich (DE) 26607

( * ) Notice: Subject to any disclaimer, the term of this patent is extended or adjusted under 35 U.S.C. 154(b) by 0 days.

(21) Appl. No.: 11/600,703

(22) Filed: Nov. 15, 2006

(65) Prior Publication Data

US 2007/0063519 A1    Mar. 22, 2007

Related U.S. Application Data

(62) Division of application No. 10/475,531, filed as application No. PCT/EP02/04109 on Apr. 12, 2002.

(30) Foreign Application Priority Data

| | | | |
|---|---|---|---|
| Apr. 20, 2001 | (DE) | ................................ | 101 19 624 |
| Aug. 4, 2001 | (DE) | ................................ | 101 38 399 |

(51) Int. Cl.
*F03D 9/00* (2006.01)
*H02P 9/04* (2006.01)

(52) U.S. Cl. ...................................................... 290/44
(58) Field of Classification Search .................... 290/44
See application file for complete search history.

(56) References Cited

U.S. PATENT DOCUMENTS

| | | | | | |
|---|---|---|---|---|---|
| 1,936,801 | A | * | 11/1933 | Nycum | ........................ 307/104 |
| 1,956,461 | A | * | 4/1934 | Butow | ......................... 361/44 |
| 2,607,910 | A | | 8/1952 | Ransom et al. | ............... 320/32 |
| 3,071,720 | A | * | 1/1963 | Geissing | ...................... 363/87 |
| 3,184,643 | A | | 5/1965 | Schultz, Sr. | .................. 361/75 |
| 3,386,002 | A | * | 5/1968 | Russell | ........................ 361/50 |
| 3,514,682 | A | * | 5/1970 | Corey | ......................... 318/761 |
| 3,708,734 | A | * | 1/1973 | Rowe | ......................... 318/762 |
| 3,809,979 | A | * | 5/1974 | Zarth | ......................... 318/762 |
| 3,828,281 | A | | 8/1974 | Chambers, Jr. | ............. 333/17.1 |
| 3,897,595 | A | * | 7/1975 | Fearno | ....................... 318/762 |

(Continued)

FOREIGN PATENT DOCUMENTS

AU    2002319133 B9    11/2002

(Continued)

OTHER PUBLICATIONS

Arsudis, D., "Doppeltgespeister Drehstromgenerator mit Spannungszwischenkreis-Umrichter im Rotorkreis für Windkraftanlagen," Dissertation, University Braunschweig, 1989, pp.. 1-163.

(Continued)

*Primary Examiner*—Darren Schuberg
*Assistant Examiner*—Pedro J Cuevas
(74) *Attorney, Agent, or Firm*—Seed IP Law Group PLLC

(57) ABSTRACT

A system and method for operating a wind turbine with a generator, drivable by a rotor, for supplying electrical power to an electric load, in particular an electric grid, are disclosed. Briefly described, one embodiment generates electrical power from an electrical generator coupled to the wind turbine, outputs the generated electrical power to an electric grid, senses a disruption in the electric grid, maintains connection of the electrical generator during the disruption, and limits the generated electrical power during at least a portion of the disruption.

25 Claims, 3 Drawing Sheets

U.S. PATENT DOCUMENTS

| | | | | |
|---|---|---|---|---|
| 4,115,727 A * | 9/1978 | Gross | | 318/762 |
| 4,129,475 A * | 12/1978 | Spurgin et al. | | 376/217 |
| 4,280,059 A | 7/1981 | Zickwolf, Jr. | | 290/40 B |
| 4,281,386 A | 7/1981 | Kondow et al. | | 700/293 |
| 4,297,738 A | 10/1981 | Lee | | 361/42 |
| 4,380,083 A * | 4/1983 | Andersson et al. | | 375/376 |
| 4,482,853 A * | 11/1984 | Bhavsar | | 318/778 |
| 4,511,807 A | 4/1985 | Somerville | | 290/44 |
| 4,535,252 A | 8/1985 | Jacobs et al. | | 290/44 |
| 4,605,530 A * | 8/1986 | Tatemichi | | 376/237 |
| 4,695,736 A * | 9/1987 | Doman et al. | | 290/44 |
| 4,719,415 A | 1/1988 | Mehnert | | 324/96 |
| 4,752,726 A * | 6/1988 | Aoyama | | 323/207 |
| 4,755,738 A * | 7/1988 | Shimamura et al. | | 323/210 |
| 4,814,695 A * | 3/1989 | Troesch | | 324/118 |
| 4,891,744 A | 1/1990 | Yamamoto et al. | | 363/89 |
| 4,982,147 A | 1/1991 | Lauw | | 318/729 |
| 4,994,684 A | 2/1991 | Lauw et al. | | 290/52 |
| 5,006,781 A | 4/1991 | Schultz et al. | | 322/25 |
| 5,083,039 A * | 1/1992 | Richardson et al. | | 290/44 |
| 5,168,208 A | 12/1992 | Schultz et al. | | 322/25 |
| 5,181,026 A | 1/1993 | Granville | | 340/870.28 |
| 5,216,621 A | 6/1993 | Dickens | | 702/58 |
| 5,225,712 A | 7/1993 | Erdman | | 290/44 |
| 5,237,511 A | 8/1993 | Caird et al. | | 702/58 |
| 5,278,773 A | 1/1994 | Cousineau | | 700/287 |
| 5,293,411 A * | 3/1994 | Miyamoto et al. | | 376/210 |
| 5,349,364 A | 9/1994 | Bryanos et al. | | 343/853 |
| 5,369,353 A | 11/1994 | Erdman | | 323/207 |
| 5,390,068 A | 2/1995 | Schultz et al. | | 361/95 |
| 5,396,165 A | 3/1995 | Hwang et al. | | 323/210 |
| 5,418,446 A | 5/1995 | Hallidy | | 322/28 |
| 5,420,495 A | 5/1995 | Hingorani | | 323/218 |
| 5,422,826 A | 6/1995 | Cousineau | | 700/287 |
| 5,506,789 A | 4/1996 | Russell et al. | | 702/58 |
| 5,524,128 A * | 6/1996 | Mowry et al. | | 376/236 |
| 5,528,444 A | 6/1996 | Cooke et al. | | 361/20 |
| 5,528,445 A | 6/1996 | Cooke et al. | | 361/20 |
| 5,536,976 A | 7/1996 | Churchill | | 307/11 |
| 5,610,501 A | 3/1997 | Nelson et al. | | 323/207 |
| 5,684,389 A * | 11/1997 | Tyll et al. | | 323/209 |
| 5,706,158 A | 1/1998 | Muller | | 361/87 |
| 5,729,120 A | 3/1998 | Stich et al. | | 323/237 |
| 5,734,257 A | 3/1998 | Schauder et al. | | 323/207 |
| 5,734,586 A | 3/1998 | Chiang et al. | | 700/286 |
| 5,754,035 A | 5/1998 | Sen | | 323/207 |
| 5,798,631 A | 8/1998 | Spée et al. | | 322/25 |
| 5,798,632 A * | 8/1998 | Muljadi | | 322/29 |
| 5,798,634 A * | 8/1998 | Terada et al. | | 323/207 |
| 5,825,162 A | 10/1998 | Kida et al. | | 323/210 |
| 5,873,251 A | 2/1999 | Iino | | 60/660 |
| 5,890,097 A | 3/1999 | Cox | | 702/67 |
| 5,899,960 A | 5/1999 | Moore et al. | | 702/60 |
| 5,907,192 A | 5/1999 | Lyons et al. | | 290/44 |
| 5,953,238 A * | 9/1999 | Mowry et al. | | 703/6 |
| 5,963,457 A | 10/1999 | Kanoi et al. | | 700/291 |
| 6,008,633 A | 12/1999 | Schettler | | 323/361 |
| 6,081,104 A | 6/2000 | Kern | | 323/268 |
| 6,091,615 A | 7/2000 | Inoshita et al. | | 363/98 |
| 6,093,975 A | 7/2000 | Peticolas | | 290/52 |
| 6,128,204 A * | 10/2000 | Munro et al. | | 363/41 |
| 6,144,924 A | 11/2000 | Dowling et al. | | 702/60 |
| 6,175,810 B1 | 1/2001 | Jurisch | | 702/58 |
| 6,188,205 B1 * | 2/2001 | Tanimoto et al. | | 323/205 |
| 6,215,202 B1 | 4/2001 | Luongo et al. | | 307/64 |
| 6,281,601 B1 | 8/2001 | Edelman et al. | | 307/29 |
| 6,313,752 B1 | 11/2001 | Corrigan et al. | | 340/657 |
| 6,404,075 B1 * | 6/2002 | Potter et al. | | 307/64 |
| 6,496,757 B1 | 12/2002 | Flueck et al. | | 700/292 |
| 6,498,462 B2 * | 12/2002 | Ballantine et al. | | 322/8 |
| 6,512,966 B2 | 1/2003 | Lof et al. | | 700/291 |
| 6,518,736 B2 | 2/2003 | Sasaki et al. | | 322/16 |
| 6,535,797 B1 | 3/2003 | Bowles et al. | | 700/286 |
| 6,664,653 B1 | 12/2003 | Edelman | | 290/52 |
| 6,671,585 B2 | 12/2003 | Lof et al. | | 705/36 R |
| 6,681,156 B1 | 1/2004 | Weiss | | 700/291 |
| 6,687,574 B2 | 2/2004 | Pietrowicz et al. | | 700/293 |
| 6,690,224 B1 | 2/2004 | Moore | | 327/296 |
| 6,693,409 B2 | 2/2004 | Lynch et al. | | 323/208 |
| 6,714,427 B1 | 3/2004 | Barthold | | 363/51 |
| 6,769,873 B2 | 8/2004 | Beauchamp et al. | | 416/3 |
| 6,784,634 B2 | 8/2004 | Sweo | | 318/727 |
| 6,812,586 B2 | 11/2004 | Wacknov et al. | | 290/52 |
| 6,838,781 B2 | 1/2005 | van de Loo | | 290/40 B |
| 6,838,860 B2 | 1/2005 | Huggett et al. | | 322/46 |
| 6,870,279 B2 | 3/2005 | Gilbreth et al. | | 290/52 |
| 6,891,281 B2 | 5/2005 | Wobben | | 290/44 |
| 6,921,985 B2 * | 7/2005 | Janssen et al. | | 290/44 |
| 6,924,991 B2 | 8/2005 | Skeist et al. | | 363/21.02 |
| 6,958,550 B2 | 10/2005 | Gilbreth et al. | | 290/52 |
| 6,984,897 B2 | 1/2006 | Skeist | | 290/44 |
| 6,990,395 B2 | 1/2006 | Ransom et al. | | 700/295 |
| 7,068,480 B2 | 6/2006 | Wong et al. | | 361/42 |
| 7,091,702 B2 | 8/2006 | Mrowiec et al. | | 322/36 |
| 7,092,798 B2 | 8/2006 | Mansingh et al. | | 700/292 |
| 7,116,010 B2 * | 10/2006 | Lasseter et al. | | 307/45 |
| 7,117,105 B2 | 10/2006 | Premerlani et al. | | 702/58 |
| 7,119,452 B2 | 10/2006 | Larsen | | 290/55 |
| 7,151,329 B2 | 12/2006 | Andarawis et al. | | 307/52 |
| 7,171,287 B2 | 1/2007 | Weiss | | 700/291 |
| 7,188,260 B1 | 3/2007 | Shaffer et al. | | 713/300 |
| 7,202,638 B2 | 4/2007 | Ye et al. | | 322/37 |
| 7,224,081 B2 | 5/2007 | Larsen | | 290/44 |
| 7,239,036 B2 * | 7/2007 | D'Atre et al. | | 290/44 |
| 7,256,509 B2 * | 8/2007 | Brandt et al. | | 290/44 |
| 7,268,443 B2 | 9/2007 | Kikuchi et al. | | 290/44 |
| 7,312,537 B1 * | 12/2007 | Walling | | 290/44 |
| 7,321,221 B2 * | 1/2008 | Bucker et al. | | 322/44 |
| 7,332,827 B2 * | 2/2008 | Nielsen | | 290/55 |
| 7,339,355 B2 * | 3/2008 | Erdman et al. | | 322/29 |
| 7,397,143 B2 * | 7/2008 | Walling | | 290/44 |
| 2002/0046155 A1 | 4/2002 | Mashinsky et al. | | 705/37 |
| 2002/0070715 A1 | 6/2002 | Sasaki et al. | | 322/28 |
| 2002/0105306 A1 * | 8/2002 | Ballantine et al. | | 322/20 |
| 2002/0109411 A1 * | 8/2002 | Potter et al. | | 307/64 |
| 2002/0190525 A1 * | 12/2002 | Worden et al. | | 290/1 A |
| 2003/0015873 A1 | 1/2003 | Khalizadeh et al. | | 290/7 |
| 2004/0135436 A1 | 7/2004 | Gilbreth et al. | | 307/18 |
| 2004/0207206 A1 | 10/2004 | Wobben | | 290/44 |
| 2004/0245783 A1 | 12/2004 | Gilbreth et al. | | 290/52 |
| 2004/0264082 A1 * | 12/2004 | Suliman et al. | | 361/62 |
| 2005/0152083 A1 | 7/2005 | Dick | | 361/85 |
| 2006/0082936 A1 | 4/2006 | Ye et al. | | 361/38 |
| 2006/0163881 A1 * | 7/2006 | Bucker et al. | | 290/44 |
| 2006/0163882 A1 * | 7/2006 | Brandt | | 290/44 |
| 2006/0192390 A1 * | 8/2006 | Saragueta et al. | | 290/44 |
| 2006/0208784 A1 | 9/2006 | Suzuki | | 327/231 |
| 2006/0267560 A1 | 11/2006 | Rajda et al. | | 323/209 |
| 2007/0085344 A1 * | 4/2007 | Janssen et al. | | 290/44 |
| 2007/0159265 A1 | 7/2007 | Weng et al. | | 331/17 |
| 2007/0187955 A1 * | 8/2007 | Erdman et al. | | 290/44 |
| 2007/0246943 A1 | 10/2007 | Chang et al. | | 290/44 |
| 2007/0273155 A1 * | 11/2007 | Barton et al. | | 290/44 |
| 2007/0278797 A1 * | 12/2007 | Flannery et al. | | 290/44 |
| 2007/0290506 A1 | 12/2007 | Walling | | 290/44 |
| 2008/0001408 A1 * | 1/2008 | Liu et al. | | 290/44 |
| 2008/0007121 A1 * | 1/2008 | Erdman et al. | | 307/47 |
| 2008/0030027 A1 * | 2/2008 | Erdman et al. | | 290/40 R |
| 2008/0067815 A1 * | 3/2008 | Suryanarayanan et al. | | 290/44 |
| 2008/0069692 A1 * | 3/2008 | Oohara et al. | | 416/31 |
| 2008/0073912 A1 * | 3/2008 | Fortmann et al. | | 290/44 |
| 2008/0088129 A1 * | 4/2008 | Altemark et al. | | 290/44 |
| 2008/0093853 A1 * | 4/2008 | Barker et al. | | 290/44 |
| 2008/0093854 A1 * | 4/2008 | Bucker et al. | | 290/44 |

| | | | | |
|---|---|---|---|---|
| 2008/0093855 A1* | 4/2008 | Walling .................... 290/44 |
| 2008/0093856 A1* | 4/2008 | Stiesdal .................... 290/44 |
| 2008/0093857 A1* | 4/2008 | Stiesdal .................... 290/44 |
| 2008/0106098 A1* | 5/2008 | Miller et al. ............... 290/44 |
| 2008/0111380 A1* | 5/2008 | Delmerico et al. ......... 290/44 |
| 2008/0150282 A1* | 6/2008 | Rebsdorf et al. ........... 290/44 |
| 2008/0150484 A1 | 6/2008 | Kimball et al. ............ 320/125 |

FOREIGN PATENT DOCUMENTS

| | | |
|---|---|---|
| CA | 2315003 C | 6/2005 |
| DE | 38 33 719 C1 | 10/1989 |
| DE | 44 28 086 C2 | 2/1996 |
| DE | 296 21 449 U1 | 2/1997 |
| DE | 196 34 464 A1 | 4/1997 |
| DE | 196 20 906 A1 | 1/1998 |
| DE | 196 24 809 A1 | 1/1998 |
| DE | 196 51 364 A1 | 6/1998 |
| DE | 197 19 308 A1 | 11/1998 |
| DE | 199 48 196 A1 | 5/2001 |
| DE | 100 19 362 A1 | 10/2001 |
| DE | 100 22 974 A1 | 11/2001 |
| DE | 100 33 029 A1 | 1/2002 |
| DE | 100 59 018 A1 | 6/2002 |
| EP | 0 677 911 B1 | 3/2000 |
| GB | 2 330 256 A | 4/1999 |
| JP | 8-182202 A | 7/1996 |
| WO | WO 93/11604 | 6/1993 |
| WO | 9952193 | 10/1999 |
| WO | WO 00/19094 | 4/2000 |
| WO | WO 01/25628 A2 | 4/2001 |
| WO | WO 01/25630 A1 | 4/2001 |
| WO | 0173518 A1 | 10/2001 |
| WO | 02/086314 A1 | 10/2002 |
| WO | 2004/040748 A1 | 5/2004 |
| WO | 2005/015012 A1 | 2/2005 |

OTHER PUBLICATIONS

Dahlgren, M. et al., "Groβtechnische Nutzung der Windenergie," *ABB Technik* Mar. 2000; pp. 31-37.

Yamamoto, M., et al., "Active and Reactive Power Control for Doubly-Fed Wound Rotor Induction Generator," *IEEE Transactions on Power Electronics* 6(4); pp. 624-629, Oct. 1991.

Australia, Patents Act 1990 "Statement of Grounds and Particulars", Notice of Opposition, in the name of Vestas Wind Systems A/S of Alsvej 21, DK-8900 Randers, Denmark, dated Jul. 24, 2007, 14 pages.

Heier, S., "Grid Integration of Wind Energy Conversion Systems", Kassel University, Germany West Sussex: John Wiley & Sons Ltd., 1998. 1, 2, 210, 211, 273-278, 326-339.

Jones, R. et al., "High Quality Mains Power from Variable-Speed Wind Turbines," Wind Engineering vol. 18, No. 1, IEE Conference, Clean Power 2001, Nov. 17-19, 1993, pp. 45-50.

Borie, Lawrence J. et al., "Development and Testing of a 20-kW Grid Interactive Photovoltaic Power Conditioning System in Western Australia," IEEE Transactions on Industry Applications, vol. 33, No. 2, Mar.-Apr. 1997, pp. 502-508.

Notice of Opposition to Grant of Patent (Section 21), in the name of Vestas New Zealand Wind Technology Limited, Mar. 28, 2007, pp. 1-3.

Notice of Opposition to Grant of Patent (Section 21), in the name of Vestas Asia Pacific Wind Technology PTE LTD, Mar. 28, 2007, pp. 1-2.

* cited by examiner

METHOD FOR OPERATING A WIND TURBINE

CROSS-REFERENCE TO RELATED APPLICATION

This application is a divisional of U.S. application Ser. No. 10/475,531, filed May 7, 2004, which is the U.S. National Phase of PCT/EP02/04109, filed Apr. 12, 2002, which claims priority to German Application Nos. 10119624.5, filed Apr. 20, 2001, and 10138399.1, filed Aug. 4, 2001, all of which are incorporated herein by reference in their entirety.

BACKGROUND OF THE INVENTION

1. Field of the Invention

The present invention relates to a method for operating a wind turbine with an electrical generator, drivable by a rotor, for supplying electrical power to an electrical load, in particular an electric grid.

2. Description of the Related Art

In known wind turbines for generating electrical energy from wind energy, the generator with the electrical load, often an electric grid, is operated in a grid-parallel mode. In other words, as soon as the wind supply is sufficient, the wind turbine will generate electrical energy and deliver it to the grid.

However, if a failure occurs in the grid, for example as a result of a short circuit in the grid, wind turbines have hitherto been disconnected from the grid and not reconnected to the grid until normal operating conditions have been restored.

This means that, following such a grid failure, is no longer possible to provide the rapid support for the grid that is particularly needed when there are large fluctuations in the voltage and/or power that is required.

BRIEF SUMMARY OF THE INVENTION

The object of the present invention is therefore to provide a control system for one or more wind turbines that compensate as far as possible for fluctuations in the grid.

This object is achieved with a method of the kind initially specified, in which the power delivered to the load by the generator is regulated in response to a current that is outputted to the load.

In a device of the kind initially specified, the object is achieved by a control device comprising a current sensor for measuring an electrical current delivered to the load, such that the power delivered by the generator to the load can be controlled in response to the current that is received by the current sensor.

In this way, the required power can be generated and delivered when there are fluctuations in the power requirements from the grid.

In order to avoid overload of parts of the wind turbine and/or the grid in the event of a grid failure, for example as a result of a short circuit in the grid, the wind turbine is controlled in such a way that the current delivered to the grid does not exceed a predefined value.

In a particularly preferred embodiment of the invention, the maximum current level that can be delivered is regulated for each grid phase, in order to support the grid as far as possible, on the one hand, without exposing components to the risk of damage, on the other hand.

A particularly preferred embodiment is one in which the wind turbine can be operated by an external input that corresponds to the stipulations made by a distant control station. In this way, a power supply company for example can request the wind turbine to deliver the amount of current which is needed at that moment to support the grid.

The electric power, current, phase position, proportion of reactive current, or the like, output to the electric grid does not exceed a predetermined amount during the disruption. In one embodiment, the predetermined amount is less than an amount associated with the electrical power output to the electric grid before the disruption occurs.

Other advantageous embodiments of the invention are described in the claims.

BRIEF DESCRIPTION OF THE SEVERAL VIEWS OF THE DRAWING(S)

One embodiment of the invention shall now be described in detail with reference to the figures. These show:

DETAILED DESCRIPTION OF THE INVENTION

Figure 1:
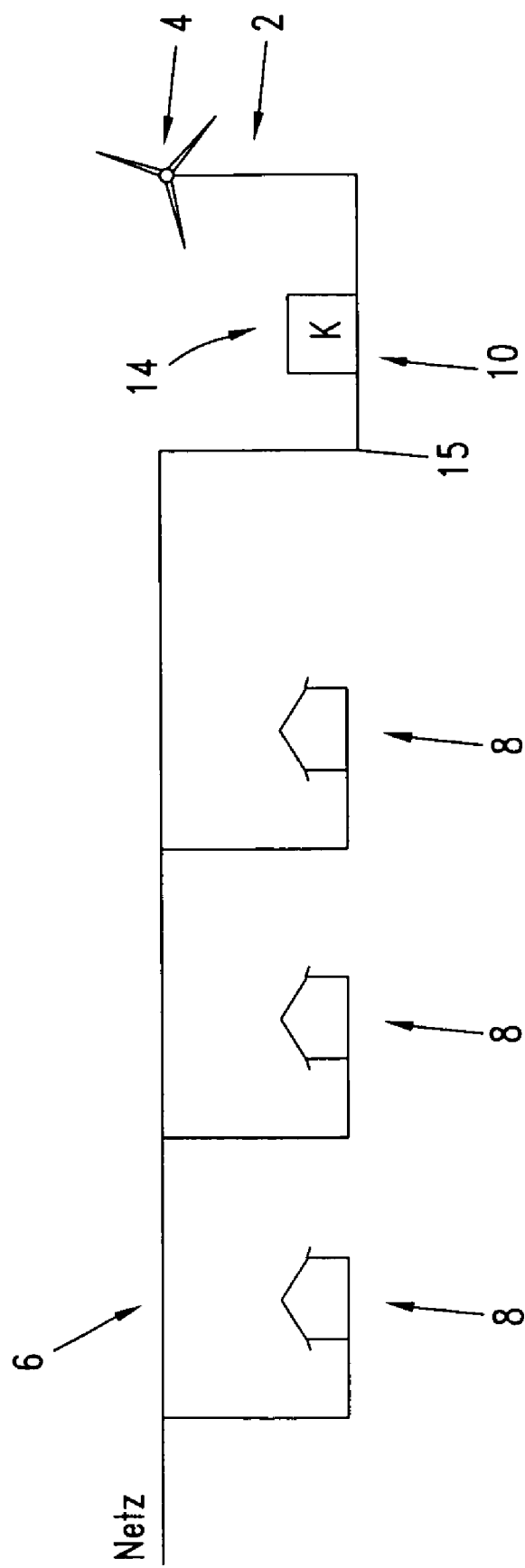
FIG. 1 illustrates a wind turbine that feeds power to a grid, in a simplified view.

A wind turbine 2, shown in simplified form in FIG. 1, comprising a rotor 4 is connected to an electric grid 6 that may be a public grid, for example. Several electrical loads 8 are connected to the grid. The electrical generator 12 (FIG. 2) of wind turbine 2 is coupled to an electrical control and regulation arrangement 10 that firstly rectifies the alternating current generated in the generator and subsequently converts the current into an alternating current with a frequency corresponding to the grid frequency. Instead of a grid 6, a single load could also be supplied with electrical energy by the wind turbine 2. The control and regulation arrangement 10 has a regulating device 14 according to the invention.

Figure 2:
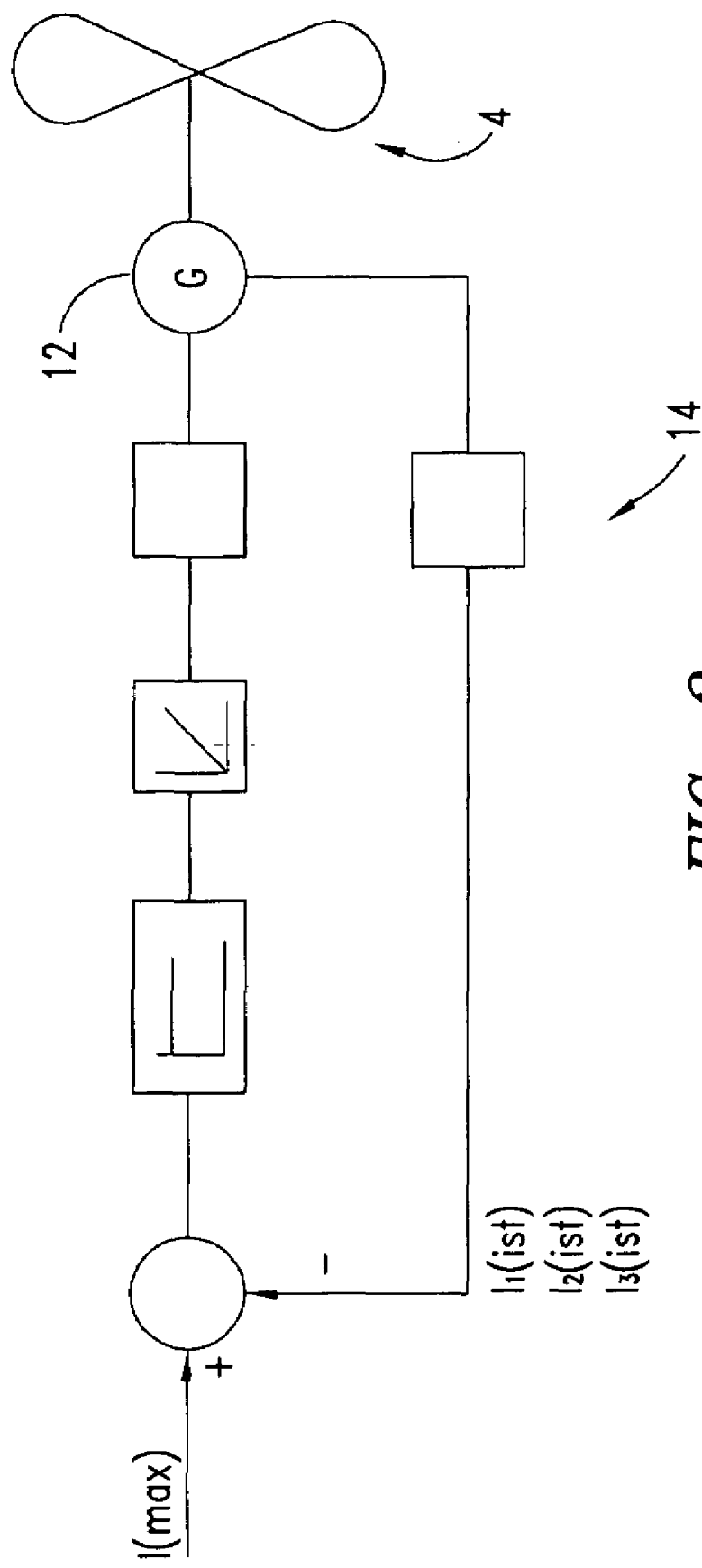
FIG. 2 illustrates a control device according to the invention for operating a wind turbine.

FIG. 2 illustrates the regulating device 14 according to the invention. The rotor 4, shown in simplified form, is coupled to a generator 12 that provides an amount of electrical power that depends on the wind speed and hence on the wind power. The alternating current produced in the generator 12 is initially rectified and subsequently converted into an alternating current that has a frequency corresponding to the grid frequency.

With the help of a current sensor 15, the amount of current being fed into the grid 6 (FIG. 1) is detected. Said current is compared at the same time with a predefined value l(max). In alternative embodiments, the sensor 15 may comprise a device for detecting a short circuit in the grid, a voltage sensing device, and/or a phase monitor.

If the current fed into the grid 6 now exceeds the predefined maximum current l(max), the power generated by the entire wind turbine (and/or its generator) is adjusted by the regulating device in such a way that the current delivered to the grid does not exceed the predefined threshold value l(max). In alternative embodiments, the power and/or current delivered to the grid does not exceed a predefinable phase position and/or a predefinable proportion of reactive current. In a multiphase system, the amount, phase position and/or the proportion of reactive current for each phase may be independently predefined, and for each phase, the predefinable value for that phase is not exceeded. In embodiments wherein reactive power is controlled, real power may also be controlled.

In the event of a short circuit, said current regulation can be accomplished, for example, by the wind turbine delivering a significantly lower level of power output to the grid than previously, while using elsewhere outside the grid the power that consequently is not fed to the grid, for example for a dump load (resistance), or by feeding the power which is not fed to the grid to capacitors or other interim storage devices. As soon as full availability of the grid is restored, delivery of the stored energy to the grid can be resumed.

In this way, even when there is a short circuit in the grid, the wind turbine can continue to deliver power to the grid and support the grid without the current exceeding the predefined threshold value as a result of the short circuit.

Figure 3:
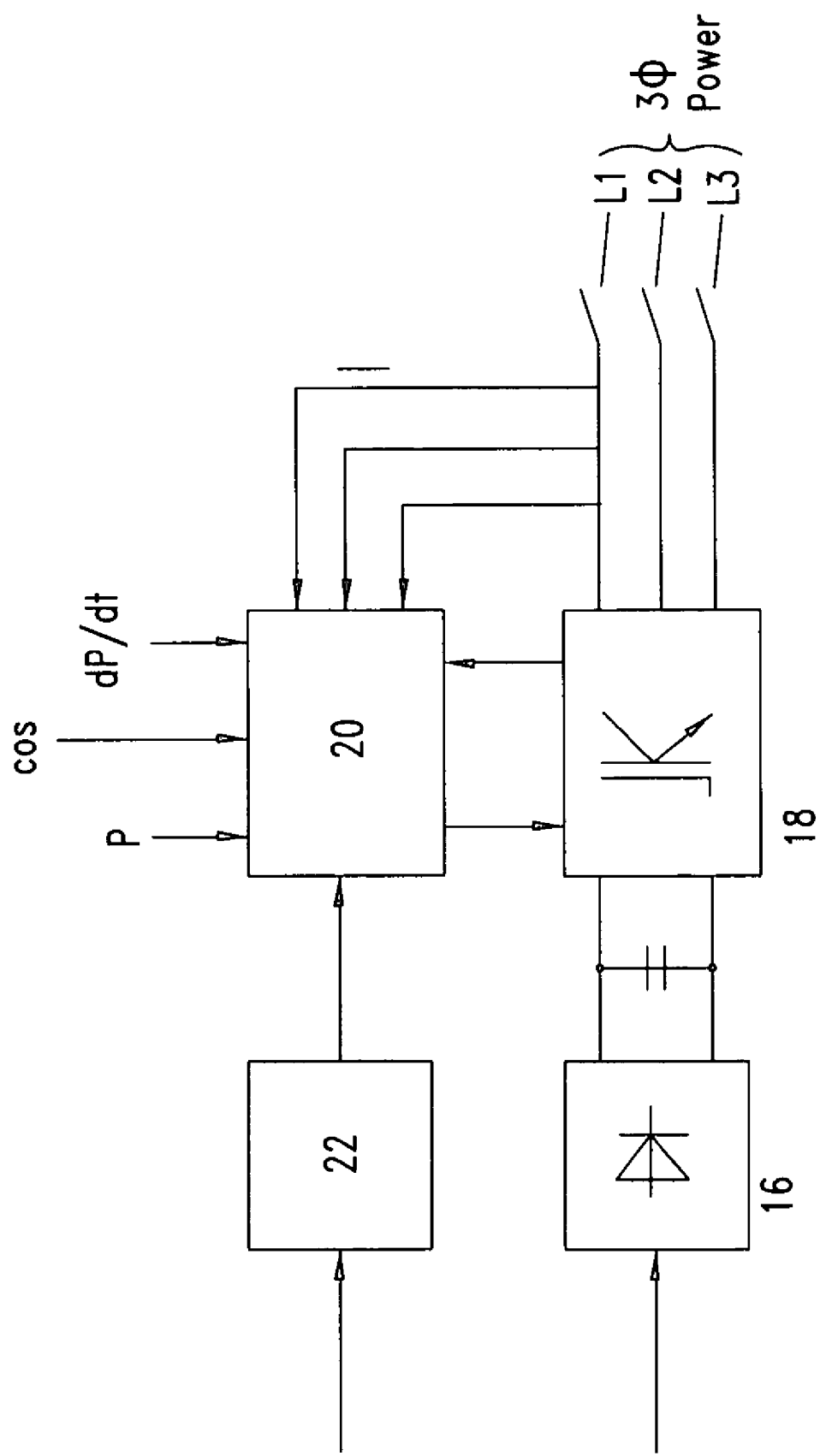
FIG. 3 illustrates a block diagram of the main components in the control and regulation arrangement.

FIG. 3 shows constituent parts of the control and regulation arrangement 10 in FIG. 1. The control and regulation arrangement 10 includes a rectifier 16, in which the alternating current produced by the generator is rectified. An inverter 18 connected to the rectifier 16 converts the direct current back into an alternating current with a frequency corresponding to the grid frequency. This current is fed into the grid 6 in three phases L1, L2 and L3. The inverter 18 is controlled with the help of a microcontroller 20 that forms part of the regulating device. The microprocessor 20 is coupled for this purpose to the inverter 18. The input variables for regulating the current with which the electrical power provided by the wind turbine 2 is fed into the grid 6 are the momentary current and/or the momentary currents, the grid frequency, the electrical power output P of the generator, the power factor cos φ and the power gradient dP/dt. Regulation, pursuant to the invention, of the current to be delivered to the grid is implemented in microprocessor 20. The current in each of phases L1, L2 and L3 is separately detected and the respective levels are taken into account in the regulation arrangement pursuant to the invention.

If the measured current (level) l(actual) of a phase rises above a predetermined maximum current, the inverter 18 is controlled in such a way that the current (level) falls below the predefined maximum current l(max), with the electrical energy generated from wind energy and not delivered to the grid being used elsewhere, for example by being outputted to a resistance (dump load) or stored in an interim storage device (e.g., a capacitor or Ultracap).

The control system for the wind turbine can operate independently. The wind turbine then detects a short circuit in the grid, for example by monitoring the voltages of the separate grid phases and/or their phase position. If predefinable threshold values for voltages and/or phase differences are reached, the wind turbine recognizes a short circuit and operates according to an algorithm provided for such a case.

Owing to the external access 22, it is possible, for example for the power supply company to whose grid the wind turbine is connected, to intervene in the operation of the wind turbine and, for example, to modify the amount of current to be delivered to the grid, the type of current (active current, reactive current) and/or the phase angle and/or phase position, etc. In this way, the power supply company can adjust precisely those values (current, voltage, electrical power) in respect of the power to be delivered to the grid by the wind turbine that correspond to the requirements of the network operator.

The invention claimed is:

1. A method for operating a wind turbine, comprising:
generating electrical power from an electrical generator coupled to the wind turbine;
outputting the generated electrical power to an electric grid from a regulating device coupled to the generator;
sensing a fault in the electric grid with a sensor;
maintaining connection of the electrical generator to the electric grid to provide some power to the electric grid during the fault;
limiting the generated electrical power provided to the electric grid from the regulating device during at least a portion of the fault; and
resuming normal delivery of electrical power to the grid after functionality of the grid is restored.

2. The method of claim 1, further comprising:
regulating the generated electrical power provided to the electric grid during at least the portion of the fault to an amount less than the electrical power output to the electric grid before the disruption occurs.

3. The method of claim 1 wherein the generated electrical power is characterized by a current, the method further comprising:
regulating the current during at least the portion of the fault to an amount less than the current output to the electric grid before the fault occurs.

4. The method of claim 1 wherein the generated electrical power is characterized by a reactive current, the method further comprising:
regulating the reactive current during at least the portion of the fault to an amount less than the reactive current output to the electric grid before the fault occurs.

5. The method of claim 1, further comprising:
increasing the generated electrical power provided to the electric grid after conclusion of the fault.

6. The method of claim 1, further comprising:
regulating the generated electrical power output provided to the electric grid during at least the portion of the fault in accordance with at least a power gradient dP/dt.

7. The method of claim 1 further comprising:
sensing a change in a frequency of the electric grid during the fault; and
regulating the generated electrical power provided to the electric grid during at least the portion of the fault in accordance with the sensed frequency change.

8. The method of claim 1 wherein the electrical power output provided to the electric grid is characterized as an alternating current (AC) power with a frequency, and wherein the frequency is substantially equal to an electric grid frequency.

9. The method of claim 1 wherein the generated electrical power is characterized by a phase position, the method further comprising:
regulating the phase position during at least the portion of the fault to an amount less than the phase position before the fault occurs.

10. The method of claim 1 wherein the electric grid is a multiphase system, and wherein the generated electrical power is characterized by at least an amount of current, a phase position, and/or a proportion of reactive current for each phase of the multiphase system, the method further comprising:
limiting for at least one phase of the multiphase system the amount of current, the phase position, and/or the proportion of reactive current during at least the portion of the fault.

11. The method of claim 10 wherein the limiting comprises:
independently limiting for each phase of the multiphase system the amount of current, the phase position, and/or the proportion of reactive current during at least the portion of the fault.

12. The method of claim 1 wherein maintaining connection of the electrical generator during the fault comprises:
maintaining connection of the electrical generator to provide some power to the electric grid during the fault when the fault is a short circuit characterized by a grid voltage deviation of more than 20%.

13. The method of claim 1 wherein the fault is characterized by a grid voltage deviation of more than 20% from a reference value.

14. The method of claim 1, further comprising:
sensing a voltage; and
limiting a reactive component of the generated electrical power in accordance with the sensed voltage during at least the portion of the fault.

15. The method of claim 1, further comprising:
limiting a power factor of the generated electrical power during at least the portion of the fault.

16. The method of claim 1 wherein the fault is a short circuit.

17. A wind turbine, comprising:
a rotor;
an electrical generator coupled to the rotor and operable to generate power into an electric grid;
a sensor operable to sense a fault on the electric grid; and
a regulating device operable to regulate the generated power into the electric grid to a reduced amount during at least a portion of the fault, while providing power above a selected amount during the fault.

18. The wind turbine of claim 17 wherein the electrical generator remains connected to the electric grid during the fault.

19. The wind turbine of claim 17 wherein the reduced amount of the generated power into the electric grid is less than an amount of power generated before the fault occurs.

20. The wind turbine of claim 17 wherein the sensor comprises:
a frequency sensor operable to sense a change in frequency of the electric grid such that the regulating device regulates the generated power into the electric grid in accordance with the sensed frequency change.

21. The wind turbine of claim 17, further comprising:
a current sensor operable to sense a change in an amount of current output to the electric grid from the electrical generator such that the regulating device regulates the generated power into the electric in accordance with the sensed current change.

22. The wind turbine of claim 17, further comprising:
a means for detecting a short circuit in the electric grid.

23. The wind turbine of claim 17 wherein the sensor is coupled to the grid.

24. The wind turbine of claim 17 wherein the sensor is coupled to the regulating device.

25. The wind turbine of claim 17 wherein the sensor is coupled to the generator.

* * * * *